(12) United States Patent
Dang et al.

(10) Patent No.: US 9,981,206 B2
(45) Date of Patent: May 29, 2018

(54) SEPARATOR FOR OIL WELL PRODUCED FLUID, AND SEPARATION DEVICE COMPRISING THE SAME

(71) Applicants: China Petroleum & Chemical Corporation, Beijing (CN); SINOPEC Exploration & Production Research Inst., Beijing (CN)

(72) Inventors: Wei Dang, Beijing (CN); Hui Huang, Beijing (CN); Changchao Hu, Beijing (CN); Lili Wang, Beijing (CN); Wenjie Tan, Beijing (CN); Zhiwei Tang, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 88 days.

(21) Appl. No.: 15/137,839

(22) Filed: Apr. 25, 2016

(65) Prior Publication Data

US 2016/0317950 A1    Nov. 3, 2016

(30) Foreign Application Priority Data

Apr. 29, 2015    (CN) .......................... 2015 1 0214004

(51) Int. Cl.
*B01D 17/025*     (2006.01)
*B01D 21/02*      (2006.01)
(Continued)

(52) U.S. Cl.
CPC ..... *B01D 17/0208* (2013.01); *B01D 17/0214* (2013.01); *B01D 17/0217* (2013.01);
(Continued)

(58) Field of Classification Search
CPC ............ B01D 17/0208; B01D 17/0214; B01D 17/0217; B01D 21/003; B01D 21/0033; B01D 21/267; E21B 43/34
(Continued)

(56) References Cited

U.S. PATENT DOCUMENTS 1,482,688 A * 2/1924 Kygar ..................... E21B 43/34
                                                              137/171
1,516,132 A * 11/1924 Allen ................. B01D 17/0214
                                                              208/187
(Continued)

FOREIGN PATENT DOCUMENTS

CN       101810941 B      7/2012
WO     2011/127786 A1    10/2011

OTHER PUBLICATIONS

Office Action dated Mar. 28, 2017, by the Kazakhstan Patent Office in corresponding Kazakhstan Patent Application No. 2016/0385.1. (2 pages).

*Primary Examiner* — Christopher Upton
(74) *Attorney, Agent, or Firm* — Buchanan Ingersoll & Rooney PC

(57) ABSTRACT

A separator for an oil well produced fluid comprises a housing and a tube group arranged within the housing. The tube group includes a plurality of horizontal pipes in a layered arrangement along a vertical direction, and a plurality of vertical pipes which allows adjacent layers of the horizontal pipes to be in fluid communication with each other. The plurality of horizontal pipes shares an inlet pipe in communication with the outside of the housing, and each of the horizontal pipes has a respective outlet. The separator is configured in such a manner that the horizontal pipes in an upper layer, a middle layer, and a lower layer are respectively used as oil pipes, water pipes, and sediment pipes.

21 Claims, 3 Drawing Sheets

(51) Int. Cl.
*B01D 17/02* (2006.01)
*B01D 21/26* (2006.01)
*E21B 43/34* (2006.01)
*B01D 21/00* (2006.01)

(52) U.S. Cl.
CPC ......... *B01D 21/003* (2013.01); *B01D 21/267* (2013.01); *E21B 43/34* (2013.01)

(58) Field of Classification Search
USPC ............... 210/521, 537, 540; 166/75.12, 357
See application file for complete search history.

(56) References Cited

U.S. PATENT DOCUMENTS

| | | | |
|---|---|---|---|
| 1,559,115 A | | 10/1925 | Marker et al. |
| 2,224,345 A | * | 12/1940 | Heathman .......... B01D 17/0214 210/540 |
| 2,423,793 A | * | 7/1947 | Olivo ...................... E21B 43/34 210/535 |
| 2,728,457 A | * | 12/1955 | Clarke ............... B01D 17/0208 210/521 |
| 4,661,127 A | | 4/1987 | Huntley |
| 4,780,201 A | * | 10/1988 | Keeter ............... B01D 17/0214 210/242.3 |
| 5,100,545 A | * | 3/1992 | Brooks .................... B03B 5/30 210/540 |
| 5,922,064 A | * | 7/1999 | Gordon, Sr. ....... B01D 17/0208 210/521 |
| 6,468,335 B1 | | 10/2002 | Polderman |
| 6,517,715 B1 | * | 2/2003 | Batten ................ B01D 17/0208 210/521 |
| 8,454,843 B2 | * | 6/2013 | Brown ................ B01D 21/245 166/75.12 |
| 2006/0162553 A1 | | 7/2006 | Esparza et al. |

\* cited by examiner

SEPARATOR FOR OIL WELL PRODUCED FLUID, AND SEPARATION DEVICE COMPRISING THE SAME

CROSS-REFERENCE TO RELATED APPLICATIONS

The present application claims the priority of Chinese patent application CN 201510214004.4, entitled "Separation device and separation method" and filed on Apr. 29, 2015, the entirety of which is incorporated herein by reference.

FIELD OF THE INVENTION

The present disclosure relates to the field of treatment of an oil well produced fluid, and in particular, to a separator for the oil well produced fluid. The present disclosure further relates to a separation device comprising the separator.

BACKGROUND OF THE INVENTION

A development procedure of an oilfield typically undergoes three stages, including a stage at which oil production increases, a stage at which oil production stays stable, and a stage at which oil production decreases with water breakthrough. In particular, with respect to some wells after several decades of oil extraction, the approach of water injection production is commonly used, in order to improve or maintain oil production thereof. This inevitably causes abundant of water contained in produced fluids of these oil wells. For example, the moisture content in the produced fluid of some oil wells reaches 90%. Therefore, there is an urgent need of a separation device that enables efficient separation of oil and water from the oil well produced fluid.

SUMMARY OF THE INVENTION

Directed against the above problem, the present disclosure provides a separator for an oil well produced fluid, and a separation device comprising the separator. The separator and separation device according to the present disclosure can be used to perform fine separation of oil, water, and sediment from the oil well produced fluid.

A separator for an oil well produced fluid according to a first aspect of the present disclosure comprises a housing and a tube group arranged within the housing. The tube group includes a plurality of horizontal pipes in a layered arrangement along a vertical direction, and a plurality of vertical pipes which allows adjacent layers of the horizontal pipes to be in fluid communication with each other. The plurality of horizontal pipes shares an inlet pipe in communication with the outside of the housing, and each of the horizontal pipes has a respective outlet. The separator is configured in such a manner that the horizontal pipes in an upper layer, a middle layer, and a lower layer are respectively used as oil pipes, water pipes, and sediment pipes.

During use of the separator of the present disclosure, after the oil well produced fluid flows into the tube group, substances contained in the fluid will be separated from each other automatically. For example, sediment will settle to enter the sediment pipe and oil will float up to enter the oil pipe, while water will enter the water pipe. This helps to reduce labor intensity and save energy. In addition, as water flows in the water pipe, oil and sediment carried therewith will continue to be separated therefrom, and respectively enter the oil pipe and the sediment pipe through the vertical pipes. This contributes to improvement of separation effects of oil, water, and sediment from each other.

In one embodiment, the plurality of horizontal pipes has three layers, including a top first layer, an intermediate second layer, and a bottom third layer, respectively as the oil pipe, the water pipe, and the sediment pipe.

In one embodiment, each of the plurality of horizontal pipes extends in a straight line. For example, the housing can be substantially in a tubular structure, such that the plurality of horizontal pipes extends along an axial direction of the housing.

In one embodiment, the plurality of horizontal pipes all extends in respective horizontal curves parallel to each other. Preferably, the plurality of horizontal pipes all extends in parallel horizontal spiral lines. As such, the length of a water flow path can be tremendously prolonged, thereby improving separation effects of oil, water, and sediment from each other. In addition, the plurality of horizontal pipes arranged in horizontal spiral lines is favorable for more effective use of spaces in a container. This is helpful in volume reduction of the separator without deterioration of separation effects thereof, thereby saving floor spaces and investments.

In one embodiment, each of the plurality of horizontal pipes has a constant inner diameter.

In one embodiment, the inlet pipe has an inner diameter gradually increasing along a flow direction of the fluid. Thus, the oil well produced fluid, after flowing into the inlet pipe, will rapidly slow down in terms of a flow rate, thereby benefiting separation of oil, water, and sediment, which are contained in the oil well produced fluid, from each other. Due to different densities of the three substances of oil, water, and sediment, separated oil will float up to the top layer to enter the oil pipe, and separated sediment will settle to the bottom layer to enter the sediment pipe, while a remaining fluid (mainly water) will stay in the intermediate layer and enter the water pipe, thereby achieving automatic separation of oil, water, and sediment from each other.

In one preferred embodiment, the water pipe is configured such that the inner diameter thereof gradually increases along the flow direction of the fluid. Although the oil, water, and sediment are largely separated from each other in the inlet pipe, the water flowing in the water pipe still carries with it some sediment and unseparated oil. As the inner diameter of the water pipe gradually increases, the flow of the water will further slow down. Thus, the sediment and unseparated oil that are carried therewith will be further separated from the water, and respectively enter the sediment pipe and the oil pipe through the vertical pipes, thereby achieving further automatic separation of oil, water, and sediment from each other. The inner diameter of the water pipe can vary in different degrees as per a treatment scale of the oil well produced fluid by the separator. Preferably, the inner diameter of the water pipe has a variation gradient in the range from 0.002 to 0.005.

In one embodiment, the vertical pipes comprise a plurality of first communicating pipes that is parallel with each other and located between the oil pipe and the water pipe, and a plurality of second communicating pipes that is parallel with each other and located between the water pipe and the sediment pipe. The first communicating pipes are arranged directly opposite to the second communicating pipes. In one preferred embodiment, a downstream first communicating pipe has a larger inner diameter than an upstream first communicating pipe. Oil and water that are contained in a downstream water flow are relatively difficult to separate from each other. The inventor has discovered that the inner diameter of the downstream vertical pipes can be enlarged to promote separation of oil from the water. Likewise, a downstream second communicating pipe can have a larger inner diameter than an upstream second communicating pipe. This facilitates settlement of tiny sediment particles into the sediment pipe.

In one embodiment, the sediment pipe is configured to extend obliquely downward. For example, the sediment pipe has an oblique angle larger than 0° and smaller than or equal to 150. This benefits discharge of sediment out of the sediment pipe.

In one embodiment, the outlet of the oil pipe and the outlet of the sediment pipe both extend outside of the housing, while the outlet of the water pipe is located within the housing, so as to allow a liquid from the water pipe to be further separated within the housing. According to such a structure, the housing per se is used similarly to a sedimentation separation container. Thus, flow separation of the oil well produced fluid in the tube group, and sedimentation separation thereof in the housing can be both accomplished within the housing. As a result, an overall volume of the separator according to the present disclosure can be remarkably reduced without deterioration in separation effects of oil, water, and sediment from each other, thereby saving floor spaces. Moreover, the tube group and the housing can be pre-assembled together, and transported and used by means of a skid, thereby enormously simplifying disassembly and assembly and transportation of the separator.

In one embodiment, an interior of the housing is provided with a plurality of partition plates extending along vertical directions, so as to be divided into a plurality of separation chambers in fluid communication with each other. A side wall of the housing is provided therein with a plurality of oil guide ports, respectively in fluid communication with the plurality of separation chambers. Thus, small amounts of oil and sediment that are carried in the water can be gradually separated from the water in the plurality of separation chambers, and oil separated in each of the plurality of separation chambers can be promptly led out via the oil guide port arranged at a corresponding separation chamber. Oil separated from the water can thus be prevented from mixing with the water again, thereby improving separation efficiency between oil and water.

In one embodiment, a bottom wall of the housing is provided therein with a plurality of sediment outlets respectively in communication with the plurality of separation chambers. Thus, sediment in the separation chamber can be promptly led out, thereby preventing excessive accumulation of sediment in the separation chamber, and reducing maintenance frequencies caused by accumulation of sediment.

In one embodiment, the plurality of partition plates comprises: an upstream first partition plate, which has a top end in sealed connection to a top wall of the housing, and a bottom end in sealed connection to the bottom wall of the housing and configured to have a through passage in a region thereof; a downstream third partition plate, which has a top end and a bottom end, respectively spaced from the top wall and the bottom wall of the housing; and a second partition plate located between the first partition plate and the third partition plate, the second partition plate having a bottom end in sealed connection to the bottom wall of the housing, and a top end spaced from the top wall of the housing. The plurality of separation chambers comprises: a first separation chamber defined by the first partition plate and a first end wall of the housing, a second separation chamber defined by the first partition plate and the second partition plate, a third separation chamber defined by the second partition plate and the third partition plate, and a fourth separation chamber defined by the third partition plate and a second end wall of the housing. The oil guide ports of the second separation chamber and the third separation chamber are located above the top end of the second partition plate and below the top end of the third partition plate, while the oil guide port of the fourth separation chamber is located below the top end of the third partition plate. A side wall of the second separation chamber is provided, at a bottom region thereof, with a dissolved gas-containing water inlet, and the second end wall of the housing is provide therein with a water outlet in communication with the fourth separation chamber. After entering the second separation chamber, the dissolved gas-containing water will release a large number of small bubbles. Oil droplets contained in the water will be combined with these small bubbles and carried thereby to float upward rapidly, thus being further separated from the water.

In one embodiment, the separator further comprises a dissolved gas pump, which has an inlet in communication with the water outlet, and an outlet in communication with the dissolved gas-containing water inlet.

In one embodiment, the plurality of partition plates further comprises a fourth partition plate located in the fourth separation chamber adjacent to the third partition plate, the fourth partition plate having a bottom end in sealed connection to the bottom wall of the housing, and a top end spaced from the top wall of the housing and above the bottom end of the third partition plate. The fourth separation chamber has a sediment outlet located downstream of the fourth partition plate. The fourth partition plate allows water downstream thereof to remain stationary, which can promote settlement of the sediment. Thus, the quality of water discharged out of the fourth separation chamber can be improved.

According to a second aspect of the present disclosure, a separation device for an oil well produced liquid is provided, comprising a cyclone and the separator according to the first aspect of the present disclosure. An outlet of the cyclone is in communication with the inlet pipe of the separator. The separation device is configured in such a manner that the cyclone performs primary separation on the oil well produced fluid, and the separator performs fine separation on a fluid from the cyclone.

According to the separation device, the cyclone is first used to perform pre-separation on the oil well produced fluid, to remove a large proportion of oil and a small proportion of water. Subsequently, the separator is used to perform fine separation on the pre-separated oil well produced fluid, which can improve separation effects between oil and water. In one embodiment, the inlet pipe of the separator is provided with a reagent inlet. In one embodiment, a polymeric aluminum purifying agent can be thrown into the water via the reagent inlet, so as to improve purifying effects of the water.

In the present application, the terms "upstream" and "downstream" are used with reference to the flow direction of the fluid.

Compared with the prior art, the present disclosure has the following advantages. At the outset, during use of the separator of the present disclosure, after the oil well produced fluid flows into the tube group via the inlet pipe, substances contained in the fluid will be separated from each other automatically. This helps to reduce labor intensity and save energy. In addition, as water flows in the water pipe, oil and sediment carried therewith will be further separated therefrom, and respectively enter the oil pipe and the sediment pipe through the vertical pipes. Compared with conventional static separation of oil, water, and sediment from each other in a settling tank, flowing water is more favorable for separation of oil and sediment that are carried with the water. This allows the separator of the present disclosure to show better separation effects of oil and water from each other.

BRIEF DESCRIPTION OF THE DRAWINGS

In the following, the present disclosure will be illustrated in detail in connection with embodiments and accompanying drawings, in which.

Figure 1:
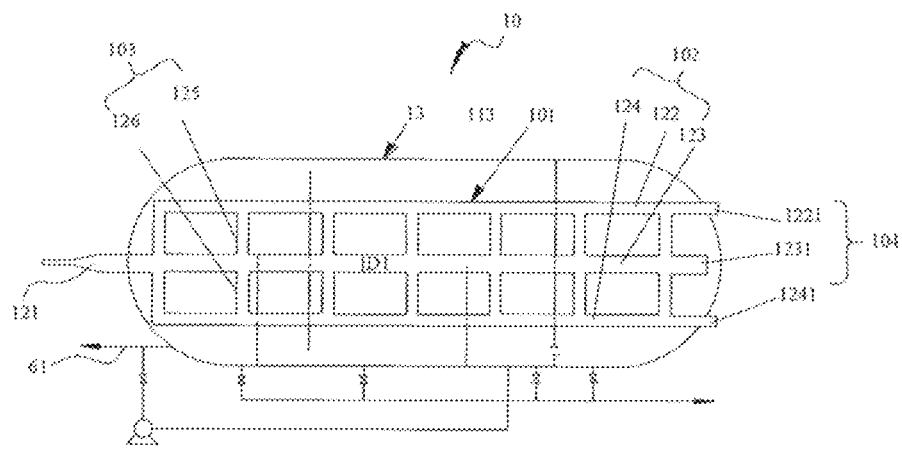
FIG. 1 schematically shows the structure of a separator for an oil well produced fluid according to a first embodiment of the present disclosure.

In the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

FIG. 1 schematically shows the structure of a separator 10 for an oil well produced fluid according to a first embodiment of the present disclosure (hereinafter referred to as the separator 10). As shown in FIG. 1, the separator 10 comprises a housing 13, and a tube group 101 arranged in the housing 13. The tube group 101 includes a plurality of horizontal pipes 102 in a layered arrangement in a vertical direction, and a plurality of vertical pipes 103 which allows adjacent layers of the horizontal pipes 102 to be in fluid communication with each other. These horizontal pipes 102 share an inlet pipe 121 in communication with the outside of the housing 13, and each of the horizontal pipes 102 has a respective outlet 104. The inlet pipe 121 is used for receiving the oil well produced fluid, and the horizontal pipes 102 are used to separate oil, water, and sediment from the oil well produced fluid.

In the embodiment as shown in FIG. 1, the horizontal pipes 102 include three layers, i.e., an upper layer horizontal pipe 122 used as an oil pipe, an intermediate layer horizontal pipe 123 used as a water pipe, and a lower layer horizontal pipe 124 used as a sediment pipe. The oil pipe 122, the water pipe 123, and the sediment pipe 124 are all straight pipes communicating with the inlet pipe 121. Each of the oil pipe 122, the water pipe 123, and the sediment pipe 124 is provided with a respective outlet, i.e., an outlet 1221 of the oil pipe 122, an outlet 1231 of the water pipe 123, and an outlet 1241 of the sediment pipe 124.

After the oil well produced fluid enters the inlet pipe 121, oil, water, and sediment that are contained therein will be automatically stratified under the effect of gravity, and respectively enter the oil pipe 122, the water pipe 123, and the sediment pipe 124, thereby achieving automatic separation of oil, water, and sediment from each other. The separated oil and sediment will be drawn out from respective outlets of the oil pipe 122 and the sediment pipe 124. The outlet 1231 of the water pipe 123 is arranged differently from the outlets of the oil pipe 122 and sediment pipe 124, and will be explained in detail in the following. Preferably, the inlet pipe 121 is configured in such a manner that an inner diameter thereof gradually increases along a flow direction of the fluid. On the whole, the inlet pipe 121 is similar to a flare pipe in shape. This facilitates further decrease of the flow rate of the oil well produced fluid in the inlet pipe 121, thereby benefiting settling separation of oil, water, and sediment from each other.

Figure 2:
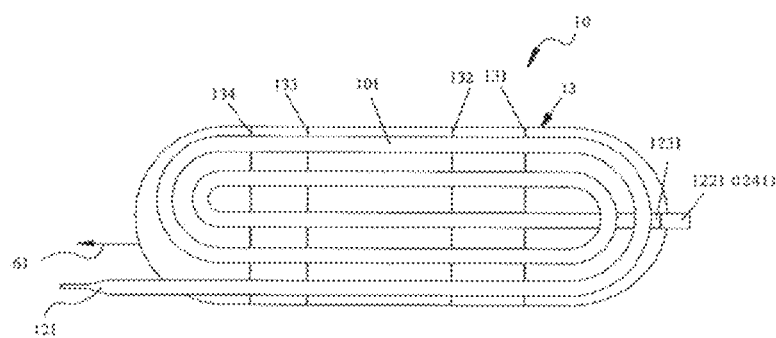
FIG. 2 schematically shows a top view of the structure of a separator for an oil well produced fluid according to a second embodiment of the present disclosure.

Although separation of oil and sediment is performed, the water entering the water pipe 123 still contains some oil and sediment therein, which, as the water flows in the water pipe 123, will be further separated and respectively enter the oil pipe 122 and the sediment pipe 123 via the vertical pipes 103. In order to prolong the flow path of the water in the water pipe 123, the oil pipe 122, the water pipe 123, and the sediment pipe 124 can be configured to extend in horizontal curves parallel with each other. In the embodiment as shown in FIG. 2, the oil pipe 122, the water pipe 123, and the sediment pipe 124 extend in horizontal spiral lines, i.e., spiral pipes, parallel with each other. It should be understood that, in the embodiment as shown in FIG. 2, vertical pipes similar to the vertical pipes 103 of the embodiment as shown in FIG. 1 are also arranged between adjacent layers of the oil pipe 122, the water pipe 123, and the sediment pipe 124.

The water pipe 123 can have a constant inner diameter. That is, its inner diameter D1 can maintain unchanged. Likewise, each of the oil pipe 122 and the sediment pipe 124 can have a constant inner diameter also. Nonetheless, the inner diameters of the oil pipe 122, the water pipe 123, and the sediment pipe 124 can be either the same with or different from each other.

Figure 3:
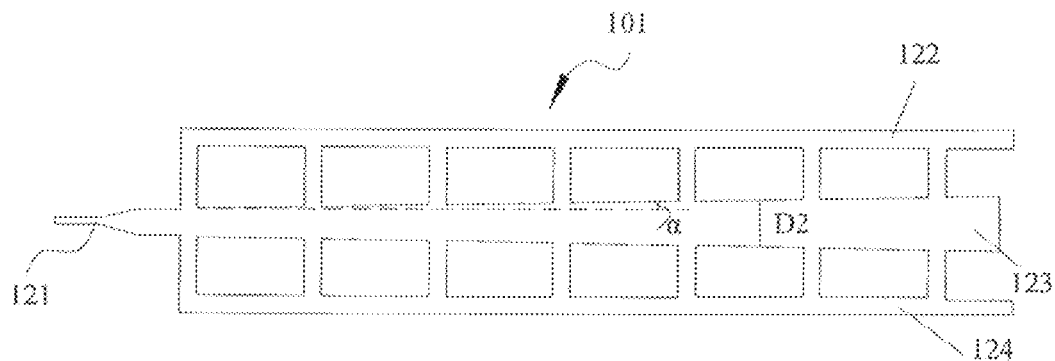
FIG. 3 schematically shows the structure of a tube group of a separator according to one embodiment of the present disclosure.

The water pipe 123 can be configured in other shapes also. As illustrated in FIG. 3, the water pipe 123 is configured to have an inner diameter D2 gradually increasing along the flow direction of the fluid. Preferably, the inner diameter D2 of the water pipe 123 has a variation gradient in the range from 0.002 to 0.005. For example, in terms of a linear water pipe 123, the gradient equals the tangent value of a field angle $\alpha$ of the water pipe 123. On the whole, the linear water pipe 123 is similar to a flare pipe in shape. Those of skill in the art can, as per handling capacity designed for the separator 10, select a proper value in the range from 0.002 to 0.005. As the inner diameter D2 of the water pipe 123 gradually increases, the flow rate of the water in the water pipe 123 further decreases, which facilitates further separation of sediment and unseparated oil that are carried in the water therefrom.

Reference can be made to FIG. 1 again. The vertical pipes 103 comprises a plurality of first communicating pipes 125 arranged between the oil pile 122 and the water pipe 123, and a plurality of second communicating pipes 126 arranged between the water pipe 123 and the sediment pipe 124. The first communicating pipes 125 are parallel with each other, and the second communicating pipes 126 are parallel with each other also. Moreover, the first communicating pipes 125 are arranged directly opposite to the second communicating pipes 126. Such being the case, each time the water in the water pipe 123 passes by a communicating position of the first communicating pipe 125, the second communicating pipe 126, and the water pipe 123, the oil and sediment contained therein will be further separated from the water once. Thus, the tube group 101 provided with the plurality of first communicating pipes 125 and second communicating pipes 126 can perform multistage-separation on the water flowing in the water pipe 123, so as to better separate oil, water, and sediment from each other, and improve separation effects of the oil well produced fluid.

Figure 4:
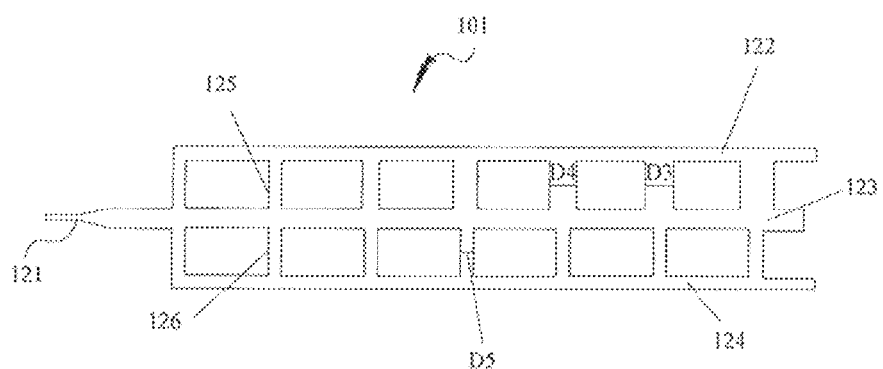
FIG. 4 schematically shows the structure of a tube group of a separator according to another embodiment of the present disclosure.

FIG. 4 shows a tube group 101 having another type of first communicating pipes 125. As indicated in FIG. 4, a downstream first communicating pipe 125 has an inner diameter D3 larger than an inner diameter D4 of a downstream first communicating pipe 125. The tube group 101 of such a structure is favorable for separation of oil from the water. It should be noted that, under such circumstances, the inner diameters D5 of all the second communicating pipes 126 can be equal to each other. Alternatively, the inner diameters D5 of the second communicating pipes 126, as the inner diameters of the first communicating pipes 125, can gradually increase downstream.

Reference can still be made to FIG. 1. The outlet 1221 of the oil pipe 122 and the outlet 1241 of the sediment pipe 124 both extend outside of the housing 13, while the outlet pipe 1231 of the water pipe 123 is placed within the housing 13. This allows the fluid (or water) from the water pipe 123 to be further separated in the housing 13.

Figure 5:
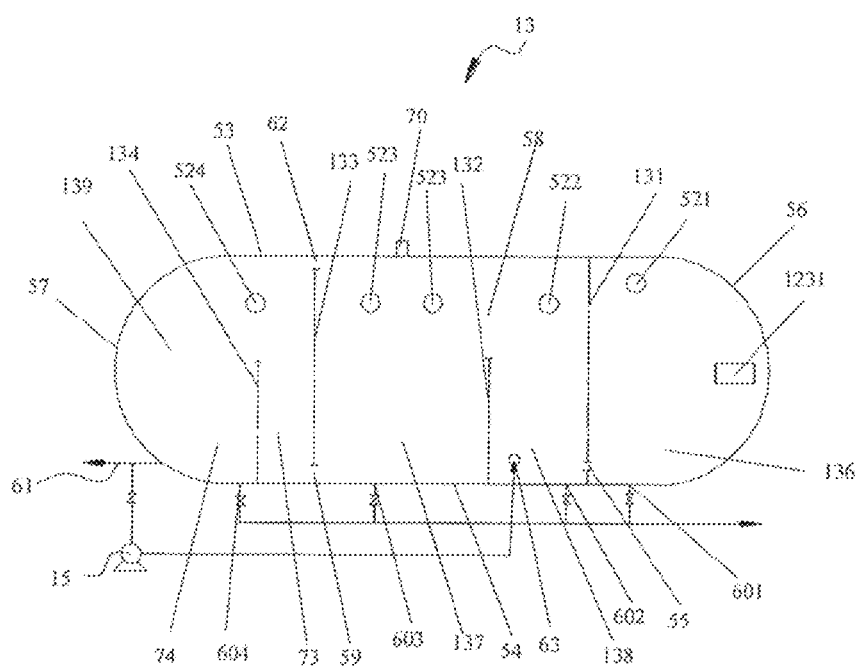
FIG. 5 schematically shows the structure of a housing of the embodiment as shown in FIG. 1.

FIG. 5 depicts the structure of the housing 13 as shown in FIG. 1. For convenient observations, the tube group 101 is omitted, and only a position where the outlet 1231 of the water pipe 123 is located in the housing 13 is schematically shown. As indicated in FIG. 5, the housing 13 is provided therein with a plurality of partition plates extending along vertical directions. Each of the plurality of partition plates is in sealed connection to a side wall of the housing 13, and intersects with the tube group 101, thereby dividing an interior of the housing 13 into a plurality of separation chambers in fluid communication with each other. The side wall of the housing 13 is provided thereon with a plurality of oil guide ports in respective fluid communication with the plurality of separation chambers, and a bottom wall 54 of the housing 13 is provided thereon with a plurality of sediment outlets in respective communication with the plurality of separation chambers. As a result, the housing 13 per se is used similarly to a sedimentation separation container.

Specifically, the partition plates can comprise, successively arranged from upstream to downstream, a first partition plate 131, a second partition plate 132, and a third partition plate 133. The first partition plate 131 has a top end and a bottom end in sealed connection to a top wall 53 and the bottom wall 54 of the housing 13 in a respective manner; the second partition plate 132 has a bottom end in sealed connection to the bottom wall 54 of the housing, and a top end spaced from the top wall 53 of the housing 13; and the third partition plate 133 is spaced from both the top wall 53 and the bottom wall 54 of the housing 13. In addition, a bottom area of the first partition plate 131 is configured to have a through passage 55. Thus, a first separation chamber 136, a second separation chamber 138, a third separation chamber 137, and a fourth separation chamber 139 are respectively formed between the first partition plate 131 and a first end wall 56 of the housing 13, between the first partition plate 131 and the second partition plate 132, between the second partition plate 132 and the third partition plate 133, and between the third partition plate 133 and a second end wall 57 of the housing 13.

The outlet 1231 of the water pipe 123 is located in the first separation chamber 136, which is in fluid communication with the second separation chamber 138 via the through passage 55. It should be noted that, in a mounting state, the through passage 55 is adjacent to the bottom wall 54 of the housing 13, but spaced therefrom at a distance of, for example, 600 mm. As such, the through passage 55 can be prevented from being blocked by sediment from the first separation chamber 136 and/or the second separation chamber 138. The second separation chamber 138 and the third separation chamber 137 are in fluid communication with each other through a gap 58 formed between the second partition plate 132 and the top wall 53 of the housing 13. A dissolved gas-containing water inlet 63 is provided in a bottom area of a side wall of the second separation chamber 138. A distance from the dissolved gas-containing water inlet 63 to the bottom wall 54 can, for example, be 600 mm. Thus, sediment deposited in a bottom portion of the second separation chamber 138 can be prevented from being stirred by dissolved gas-containing water. The third separation chamber 137 and the fourth separation chamber 139 are in fluid communication with each other through a gap 59 formed between the bottom end of the third partition plate 133 and the bottom wall 54 of the housing 13. Although a gap 62 formed between the top end of the third partition plate 133 and the top wall 53 of the housing 13 enables communication between the third separation chamber 137 and the fourth separation chamber 139, water does not actually flow through the gap 62. This will be further explained in the following. A water outlet 61 communicating with the fourth separation chamber 139 is provided on the second end wall 57 of the housing 13.

During use of the separator, water from the outlet 1231 of the water pipe 123 first enters the first separation chamber 136, wherein water, oil, and sediment are separated from each other. Afterwards, separated oil is led out via an oil guide port 521 of the first separation chamber 136; separated sediment is discharged via a sediment outlet 601 of the first separation chamber 136; and remaining water flows into the second separation chamber 138 via the through passage 55. Dissolved gas-containing water entering the second separation chamber 138 through the dissolved gas-containing water inlet 63 will release a large number of tiny bubbles, which can drive oil contained in the water to float upwardly in a rapid manner, thereby achieving the purpose of separation between oil and water. Oil separated in the second separation chamber 138 will be led out via an oil guide port 522 of the second separation chamber 138; sediment will be discharged via a sediment outlet 602 of the second separation chamber 138; and water will flow into the third separation chamber 137 via the gap 58. In the third separation chamber 137, oil, water, and sediment will be further separated from each other. Particularly, dissolved gas-containing water which has not released bubbles completely in the second separation chamber 138, will continue to release tiny bubbles in the third separation chamber 137, thereby promoting separation between oil and water. Oil separated in the third separation chamber 137 will be led out via an oil guide port 523 of the third separation chamber 138; sediment will be discharged via a sediment outlet 603 of the third separation chamber 137; and water will flow into the fourth separation chamber 139 via the gap 59. In the fourth separation chamber 139, oil, water, and sediment will be further separated from each other, after which, separated oil will be led out via an oil guide port 524 of the fourth separation chamber 139; separated sediment will be discharged via a sediment outlet 604 of the fourth separation chamber 139; and water will flow out of the housing 13 via the water outlet 61.

The separator 10 further comprises a dissolved gas pump 15, which has an inlet communicating with the water outlet 61, and an outlet communicating with the dissolved gas-containing water inlet 63. Thus, the dissolved gas pump 15 can use separated water to prepare dissolved gas-containing water, thereby saving water resources. The dissolved gas pump 15 is well known by those of skill in the art, and therefore will not be repeated herein. The gas used in preparation of the dissolved gas-containing water can be air or an inert gas, such as nitrogen.

The dissolved gas-containing water fed into the second separation chamber 138 will release a large amount of gas, which will accumulate at a top portion of the housing 13. Therefore, a vent valve 70 is mounted at the top portion of the housing 13. Due to flow of water, gas released from the dissolved gas-containing water possibly exist in all of the second separation chamber 138, the third separation chamber 137, and the fourth separation chamber 139. The gap 62 formed between the top end of the third partition plate 133 and the top wall 53 of the housing 13 constitutes a passage, through which gas from the fourth separation chamber 139 flows into the third separation chamber 137 and is discharged via the vent valve 70. That is, the gap 62 is solely used for discharge of the gas in the fourth separation chamber 139, while water or oil will not flow therethrough. Under such circumstances, the oil guide ports 522 and 523 of the second separation chamber 138 and the third separation chamber 137 are both located above the top end of the second partition plate 132 and below the top end of the third partition plate 133, while the oil guide port 524 of the fourth separation chamber 139 is located below the top end of the third partition plate 137. This can prevent oils in the third separation chamber 137 and the fourth separation chamber 139 from passing through the gap 62. Moreover, the housing 13 can be provided thereon with a liquid level meter corresponding to each of the separation chambers, so as to control the oil level in each of the separation chambers more accurately. Additionally, in smooth operations, since the plurality of separation chambers is in communication with each other, the liquid levels in the plurality of separation chambers are substantially equal to each other. Therefore, the oil guide ports 521, 522, 523, and 524 can be substantially arranged at a same level, and one liquid level meter will suffice. As an alternative, the second separation chamber 138 and the third separation chamber 137 can certainly share one oil guide port.

In the fourth separation chamber 139, in order to prevent the dissolved gas-containing water from releasing gas to stir deposited sediment, and to prevent the sediment in the third separation chamber 137 from entering a settling chamber 74, a fourth partition plate 134 is provided adjacent to the third partition plate 133 downstream thereof. The fourth partition plate 134 has a bottom end in sealed connection to the bottom wall 54 of the housing 13, and a top end spaced from the top wall 53 of the housing 13 and above the bottom end of the third partition plate 133. Thus, a buffer area 73 as a part of the fourth separation chamber 139 is formed between the fourth partition plate 134 and the third partition plate 133. And the settling chamber 74 as another part of the fourth separation chamber 139 is formed between the fourth partition plate 134 and the second end wall 57 of the housing 13. The sediment outlet 604 of the fourth separation chamber 139 is located within the settling chamber 74, i.e., downstream of the fourth partition plate 134. In this way, water from the third separation chamber 137 first flows into the buffer area 73, and will not flow into the settling chamber 74 until it overflows to pass by the fourth partition plate 134. This prevents water flowing in the second separation chamber 138, the third separation chamber 137, and the buffer area 73 from disturbing deposition of the sediment in the settling chamber 74, and thereby promotes improvement of quality of water discharged from the water outlet 61.

Figure 6:
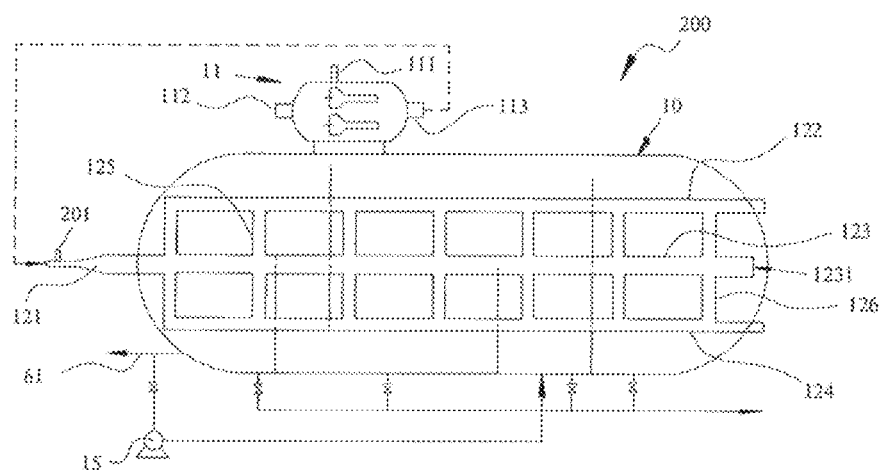
FIG. 6 schematically shows the structure of a separation device for an oil well produced fluid according to one embodiment of the present disclosure.

FIG. 6 shows a separation device 200 for the oil well produced fluid according to one embodiment of the present disclosure. The separation device 200 comprises a cyclone 11 and the separator 10. The cyclone 11 is provided thereon with a liquid inlet 111, an overflow port 112, and an outlet 113. The oil well produced fluid is fed into the cyclone 11 via the liquid inlet 111. The cyclone 11 performs a first separation on the oil well produced fluid by means of cyclonic separation. The structure of the cyclone 11 is well known by those of skill in the art, and will therefore not be repeated herein.

Separated oil having a low content of water will be discharged via the overflow port 112. The outlet 113 communicates with the inlet pipe 121 of the separator 10, so as to feed separated oil-containing wastewater into the separator 10 via the outlet 113. The separator 10 will perform a second separation on the oil-containing wastewater, so as to further decrease the contents of oil and sediment in the water. A flow regulating valve can be arranged on a pipe of each of the overflow port 112 and the outlet 113 of the cyclone 11, so as to control flow rate in a respective pipe. A reagent inlet 201 can be provided between the outlet 113 and the inlet pipe 121 of the separator 10, such that a purifying agent can be put into the produced fluid.

The cyclone 11 can be arranged outside of the separator 10 at a top portion of the separator 10, thereby reducing floor spaces of the separation device 200. The cyclone 11 and the separator 10 can be integrated into one piece, so as to facilitate mounting and transportation of the separation device 200 in a significant manner.

Although the present disclosure has been described with reference to preferred embodiments, various modifications and variants to the present disclosure may be made by anyone skilled in the art, without departing from the scope of the present disclosure. In particular, as long as there is no structural conflict, various embodiments as well as the respective technical features mentioned herein may be combined with each other in any manner. The present disclosure is not limited to the specific embodiments disclosed herein, but rather includes all the technical solutions falling within the scope of the claims.

The invention claimed is:

1. A separator for an oil well produced fluid, comprising:
   a housing, and
   a tube group arranged within the housing, the tube group including a plurality of horizontal pipes in a layered arrangement along a vertical direction, and a plurality of vertical pipes which allows adjacent layers of the horizontal pipes to be in fluid communication with each other, wherein the plurality of horizontal pipes shares an inlet pipe in communication with outside of the housing, and each of the horizontal pipes has a respective outlet,
   wherein the separator is configured in such a manner that the horizontal pipes in an upper layer, a middle layers, and a lower layer are respectively used as oil pipes, water pipes, and sediment pipes;
   wherein an interior of the housing is provided with a plurality of partition plates extending along vertical directions, so as to be divided into a plurality of separation chambers in fluid communication with each other; and wherein a side wall of the housing is provided therein with a plurality of oil guide ports, respectively in fluid communication with the plurality of separation chambers.

2. The separator according to claim 1, wherein each of the plurality of horizontal pipes extends in a straight line.

3. The separator according to claim 1, wherein the plurality of horizontal pipes all extends in respective horizontal curves parallel to each other.

4. The separator according to claim 3, wherein the plurality of horizontal pipes all extends in respective horizontal spiral lines parallel to each other.

5. The separator according to claim 1, wherein each of the plurality of horizontal pipes has a constant inner diameter.

6. The separator according to claim 1, wherein the water pipe is configured to have a gradually increasing inner diameter along a flow direction of the fluid.

7. The separator according to claim 6, wherein the inner diameter of the water pipe has a variation gradient in the range from 0.002 to 0.005.

8. The separator according to claim 1, wherein the vertical pipes comprise a plurality of first communicating pipes that is parallel with each other and located between the oil pipe and the water pipe, and a plurality of second communicating pipes that is parallel with each other and located between the water pipe and the sediment pipe, and
wherein the first communicating pipes are arranged directly opposite to the second communicating pipes.

9. The separator according to claim 8, wherein a downstream first communicating pipe has a larger inner diameter than an upstream first communicating pipe.

10. The separator according to claim 8, wherein a downstream second communicating pipe has a larger inner diameter than an upstream second communicating pipe.

11. The separator according to claim 1, wherein the sediment pipe is configured to extend obliquely downward.

12. The separator according to claim 11, wherein the sediment pipe has an oblique angle larger than 0° and smaller than or equal to 15°.

13. The separator according to claim 1, wherein the plurality of horizontal pipes has three layers, including a top first layer, an intermediate second layer, and a bottom third layer, respectively as the oil pipe, the water pipe, and the sediment pipe.

14. The separator according to claim 1, wherein the inlet pipe has an inner diameter gradually increasing along the flow direction of the fluid.

15. The separator according to claim 1, wherein a bottom wall of the housing is provided therein with a plurality of sediment outlets respectively in communication with the plurality of separation chambers.

16. The separator according to claim 15, wherein:
the plurality of partition plates comprises:
an upstream first partition plate, which has a top end in sealed connection to a top wall of the housing, and a bottom end in sealed connection to the bottom wall of the housing and configured to have a through passage in a region thereof,
a downstream third partition, plate, which has a top end and a bottom end, respectively spaced from the top wall and the bottom wall of the housing, and
a second partition plate located between the first partition plate and the third partition plate, the second partition plate having a bottom end in sealed connection to the bottom wall of the housing, and a top end spaced from the top wall of the housing; and
the plurality of separation chambers comprises:
a first separation chamber defined by the first partition plate and a first end wall of the housing, a second separation chamber defined by the first partition plate and the second partition plate, a third separation chamber defined by the second partition plate and the third partition plate, and a fourth separation chamber defined by the third partition plate and a second end wall of the housing,
wherein the oil guide ports of the second separation chamber and the third separation chamber are located above the top end of the second partition plate and below the top end of the third partition plate, while the oil guide port of the fourth separation chamber is located below the top end of the third partition plate, and
wherein a side wall of the second separation chamber is provided, at a bottom region thereof, with a dissolved gas-containing water inlet, and the second end wall of the housing is provide therein with a water outlet in communication with the fourth separation chamber.

17. The separator according to claim 16, wherein the plurality of partition plates further comprises a fourth partition plate located in the fourth separation chamber adjacent to the third partition plate, the fourth partition plate having a bottom end in sealed connection to the bottom wall of the housing, and a top end spaced from the top wall of the housing and above the bottom end of the third partition plate, and
wherein the fourth partition plate has a sediment outlet located downstream of the fourth partition plate.

18. The separator according to claim 16, further comprising a dissolved gas pump, which has an inlet in communication with the water outlet, and an outlet in communication with the dissolved gas-containing water inlet.

19. A separation device for an oil well produced liquid, comprising a cyclone and the separator according to claim 1,
wherein an outlet of the cyclone is in communication with the inlet pipe of the separator, and
wherein the separation device is configured in such a manner that the cyclone performs primary separation on the oil well produced fluid, and the separator performs fine separation on a fluid from the cyclone.

20. The separation device according to claim 19, wherein the inlet pipe of the separator is provided with a reagent inlet.

21. A separator for an oil well produced fluid, comprising:
a housing, and
a tube group arranged within the housing, the tube group including a plurality of horizontal pipes in a layered arrangement along a vertical direction, and a plurality of vertical pipes which allows adjacent layers of the horizontal pipes to be in fluid communication with each other, wherein the plurality of horizontal pipes shares an inlet pipe in communication with outside of the housing, and each of the horizontal pipes has a respective outlet,
wherein the separator is configured in such a manner that the horizontal pipes in an upper layer, a middle layers, and a lower layer are respectively used as oil pipes, water pipes, and sediment pipes; and
wherein the outlet of the oil pipe and the outlet of the sediment pipe both extend outside of the housing, while the outlet of the water pipe is located within the housing, so as to allow a liquid from the water pipe to be further separated within the housing.

* * * * *